United States Patent Office

2,920,044
Patented Jan. 5, 1960

2,920,044
ORGANOSILOXANE FLUIDS

William H. Daudt, Midland, Mich., assignor to Dow Corning Corporation, Midland, Mich., a corporation of Michigan No Drawing. Application October 7, 1957
Serial No. 688,429

1 Claim. (Cl. 252—78)

This invention relates to organosiloxane fluids of exceptionally high compressibility. This application is a continuation-in-part of applicant's copending application Serial No. 436,220, filed June 11, 1954, now abandoned.

It has been known for some time that various organosiloxane fluids were compressible, and it has also been known that many siloxane fluids are useful as hydraulic fluids and in shock absorbers. However, previously known organosiloxane fluids have for various reasons not been suitable for use in applications requiring high degrees of compressibility such as those encountered in the so-called liquid spring.

It is the primary object of this invention to provide a new organopolysiloxane fluid which is better than previously known siloxanes with respect to compressibility, thermal response and other properties needed in fluids for liquid springs. Another object is to prepare a siloxane fluid which has the requisite thermal stability, temperature viscosity coefficient, pour point and chemical inertness for use as a hydraulic media and for uses in which compressible fluids are needed.

This invention relates to a fluid composed essentially of a mixture of (1) at least 25% by weight of 3,3-bis(trimethylsiloxy) hexamethyltrisiloxane and (2) a dimethylsiloxane fluid of at least 100 cs. viscosity at 25° C., in amount sufficient that said mixture has a minimum viscosity at 25° C. of 10 cs.

The dimethylpolysiloxane fluids employed herein are linear materials which may be endblocked with trimethylsilyl groups, hydroxy groups or alkoxy groups or combinations of these materials. Such fluids are well known in the art. For the purpose of this invention the viscosity range of the dimethylpolysiloxane can be from 100 cs. up to nonflowing benzene-soluble gums. The higher the molecular weight of the dimethylpolysiloxane, the less is required in the mixture of this invention to give the desired viscosity range.

The second ingredient of the mixture of this invention is the fluid 3,3-bis(trimethylsiloxy)hexamethyltrisiloxane having the formula $Si(OSiMe_3)_4$. This compound is known in the art and may be prepared by any convenient method. The preferred method is that of cohydrolyzing silicon tetrachloride and trimethylchlorosilane in an alcohol media. For the purpose of this invention the trisiloxane may contain small amounts, i.e., 10% or less of higher boiling materials which form during the cohydrolysis of the chlorosilanes. These materials are polymeric compounds containing two or more unsubstituted silicon atoms.

The mixtures of this invention are prepared by merely bringing together the dimethylpolysiloxane and the trisiloxane. They are completely miscible with each other.

The term "composed essentially of" as employed in the claim means that the claimed compositions can contain minor amounts of non-essential ingredients for the purpose of improving properties other than compressibility. These non-essential ingredients can include oxidation inhibitors, lubrication improvers and other siloxanes to lower the freezing point of the mixture. Such additional siloxane components can contain phenyl radicals, methyl radicals, ethyl radicals, vinyl radicals and the like.

The following examples are illustrative only and should not be construed as limiting the invention which is properly set forth in the appended claim.

*Example 1*

15 parts by weight of a 350,000 cs. trimethylsilyl endblocked dimethylpolysiloxane fluid was mixed with 85 parts by weight of 3,3-bis(trimethylsiloxy)hexamethyltrisiloxane having a viscosity of 3.45 cs. This material contained about 1 to 2% of higher polymeric trimethylsiloxy siloxanes. The resulting solution had a viscosity of 119 cs. at 25° C. This fluid was compressed 6.1% of it volume by an application of 10,000 p.s.i. and 10% of its volume by an application of 19,650 p.s.i. This material is suitable for use as a liquid spring.

*Example 2*

15 parts by weight of a 1,000,000 cs. trimethylsilyl endblocked dimethylpolysiloxane fluid was mixed with 85 parts by weight of the trisiloxane of Example 1 to give a solution having a viscosity of 243.5 cs. at 25° C. This solution was compressed 6.1% of it volume by the application of 10,000 p.s.i. and 10% of its volume by the application of 19,100 p.s.i. This solution was satisfactory for use as a liquid spring.

*Example 3*

29 parts by weight of a 100,000 cs. trimethylsilyl endblocked dimethylpolysiloxane fluid was mixed with 71 parts by weight of pure 3,3-bis(trimethylsiloxy)hexamethyltrisiloxane to give a solution having a viscosity of 396 cs. at 25° C. This solution was compressed 6% of its volume by the application of 9,900 p.s.i., 10% of its volume by the application of 20,700 p.s.i. and 15% of its volume by the application of 38,000 p.s.i.

*Example 4*

The following fluid mixtures were prepared having the viscosities shown. The fluids were compressed the amounts shown by the application of 20,000 p.s.i. pressure.

| | Fluid Composition (percent by weight) | Visc. (cs. at 25° C.) | Percent Compression |
|---|---|---|---|
| I | 29% 12,500 cs. trimethylsiloxy-endblocked dimethylsiloxane fluid. 71% 3,3-bis(trimethylsiloxy)-hexamethyltrisiloxane. | 123.5 | 9.81 |
| II | 29% 100,000 cs. trimethylsiloxy-endblocked dimethylsiloxane fluid. 71% 3,3-bis(trimethylsiloxy)-hexamethyltrisiloxane. | 400 | 10.05 |
| III | 29% 1,000 cs. trimethylsiloxy-endblocked dimethylsiloxane fluid. 71% 3,3-bis(trimethylsiloxy)-hexamethyltrisiloxane. | 35.8 | 10.03 |
| IV | 60% 1,000 cs. trimethylsiloxy-endblocked dimethylsiloxane fluid. 40% 3,3-bis(trimethylsiloxy)-hexamethyltrisiloxane. | 183.5 | 9.68 |

That which is claimed is:

A fluid composed essentially of a mixture of (1) at least 25% by weight of 3,3-bis(trimethylsiloxy)hexamethyltrisiloxane and (2) a dimethylsiloxane fluid of at least 100 cs. viscosity at 25° C., in amount sufficient that said mixture has a minimum viscosity at 25° C. of 10 cs.

References Cited in the file of this patent
UNITED STATES PATENTS

| | | |
|---|---|---|
| 2,397,727 | Daudt | Apr. 2, 1946 |
| 2,398,187 | McGregor et al. | Apr. 9, 1946 |
| 2,468,869 | Daudt | May 3, 1949 |
| 2,519,926 | Patnode | Aug. 22, 1950 |
| 2,614,989 | Hunter et al. | Oct. 21, 1952 |